(12) United States Patent
Smith et al.

(10) Patent No.: US 9,622,418 B2
(45) Date of Patent: Apr. 18, 2017

(54) METHOD OF TAGGING SQUARE BALES

(71) Applicant: CNH America LLC, New Holland, PA (US)

(72) Inventors: Kevin M. Smith, Narvon, PA (US); Christopher A. Foster, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 938 days.

(21) Appl. No.: 13/949,857

(22) Filed: Jul. 24, 2013

(65) Prior Publication Data

US 2013/0305658 A1 Nov. 21, 2013

Related U.S. Application Data

(62) Division of application No. 12/871,439, filed on Aug. 30, 2010, now Pat. No. 8,516,954.

(51) Int. Cl.
*A01F 15/08* (2006.01)
*A01F 15/10* (2006.01)
*G06Q 10/08* (2012.01)

(52) U.S. Cl.
CPC .......... *A01F 15/08* (2013.01); *A01F 15/101* (2013.01); *G06Q 10/08* (2013.01)

(58) Field of Classification Search
CPC .......... A01F 15/08; A01F 15/14; A01F 15/10; A01F 15/101; A01F 2015/102; A01F 15/04; G06Q 10/08; B65C 3/02; Y10T 156/10; B30B 9/3003
USPC ........... 100/102, 179, 88, 44; 56/10.2 B, 341
See application file for complete search history.

(56) References Cited

U.S. PATENT DOCUMENTS

| | | | |
|---|---|---|---|
| 1,994,947 A | 3/1935 | Gaus | |
| 1,996,328 A | 4/1935 | Gaus | |
| 3,232,215 A | 2/1966 | Agle | |
| 3,890,891 A | 6/1975 | Floyd et al. | |
| 4,286,513 A | 9/1981 | Floyd et al. | |
| 4,479,427 A | 10/1984 | Floyd et al. | |
| 6,838,781 B2 | 1/2005 | van de Loo | |
| 7,591,628 B2 | 9/2009 | Noonan et al. | |
| 7,621,111 B2 * | 11/2009 | Roberts | A01F 15/08 100/102 |
| 8,516,954 B2 * | 8/2013 | Smith | G06Q 10/08 100/2 |
| 2003/0209013 A1 | 11/2003 | Tsai | |
| 2007/0089390 A1 | 4/2007 | Hendrickson et al. | |
| 2007/0175341 A1 | 8/2007 | Roberts | |
| 2007/0181469 A1 | 8/2007 | Stover | |
| 2007/0185612 A1 | 8/2007 | Stevens et al. | |
| 2009/0025578 A1 | 1/2009 | Roberts | |

(Continued)

FOREIGN PATENT DOCUMENTS

WO 2009044092 A1 4/2009

*Primary Examiner* — Jimmy T Nguyen
(74) *Attorney, Agent, or Firm* — Patrick M. Sheldrake

(57) ABSTRACT

An apparatus for inserting a tag into a bale of agricultural material during bale production is configured such that the tag is inserted within the bale material within reading distance of an outer surface of the final bale. In square bales, the tag is placed in either the first or last slice of the bale. In round bales, the tag is place in the outer circumferential layer of the bale as it is formed. The tag may be gravity fed or forcibly fed into the stream of crop material as it passes from the baling apparatus pick-up to the baling chamber.

5 Claims, 4 Drawing Sheets

(56) References Cited

U.S. PATENT DOCUMENTS

2009/0107348 A1* 4/2009 Noonan ............... A01D 87/127
100/8
2009/0107349 A1 4/2009 Noonan et al.
2009/0297320 A1 12/2009 Daraie et al.

* cited by examiner

METHOD OF TAGGING SQUARE BALES

TECHNOLOGY FIELD

This divisional application claims priority under 35 U.S.C. §120 from U.S. patent application Ser. No. 12/871,439, which is now issued as U.S. Pat. No. 8,516,954, filed on Aug. 30, 2010 by Kevin M. Smith and Christopher A. Foster with the same title, the full disclosure of which is hereby incorporated by reference.

The present invention relates generally to a method and apparatus for facilitating the labeling and tracking bales of agricultural material. The present invention is particularly well suited, but in no way limited, for use with square balers.

BACKGROUND

For many years agricultural balers have been used to consolidate and package crop material so as to facilitate the storage and handling of the crop material for later use. Usually, a mower-conditioner cuts and conditions the crop material for windrow drying in the sun. When the cut crop material is properly dried, a baler, for example a round baler, travels along the windrows to pick up the crop material and form it into cylindrically-shaped round bales.

More specifically, pickups of the baler gather the cut and windrowed crop material from the ground then convey the cut crop material into a bale-forming chamber within the baler. A drive mechanism operates to activate the pickups, augers, and a rotor of the feed mechanism. A conventional bale forming chamber may include of a pair of opposing sidewalls with a series of belts, chains, and/or rolls that rotate and compress the crop material into a cylindrical shaped bale. Square balers operate on similar principles but form "slices" which when stacked together form a rectangular or "square" bale.

When the bale has achieved a desired size and density, a wrapping system may wrap the bale to ensure that the bale maintains its shape and density. For example, a twine wrapping apparatus may be provided to wrap the bale of crop material while still inside the bale forming chamber. A cutting or severing mechanism may be used to cut the twine once the bale has been wrapped. The wrapped bale may be ejected from the baler and onto the ground by, for example, raising a tailgate of the baler. The tailgate is then closed and the cycle repeated as necessary and desired to manage the field of cut crop material. In some square baling machines, a formed baled is ejected out the back of the baler as a new bale is formed.

To identify a bale, the wrapping material is often provided with a tag containing information such as the size, weight, and date of the bale. It is also desirable to be able to label each bale with other important properties, such as moisture content and nutritional value. Other potential parameters of interest include but are not limited to GPS Location when bale is tied, farm name, farmer id, field name, preservative type, amount of preservative applied, etc.

Current apparatus and methods for tagging bales have many drawbacks. The existing apparatus to apply the tag can be complex and expensive. Including the tag in the wrapping material is difficult since the amount of wrap used per bale is not known until baling, consequently multiple tags may be found on each bale. A better way to tag and track each bale and its properties is needed. Applying a tag to a strand of twine is difficult.

SUMMARY

In some embodiments, the invention provides methods of labeling a bale including picking up crop material, conveying the crop material to a bale chamber where a bale is formed and inserting a wireless tag into the crop material subsequent to pick-up but prior to reaching the bale chamber in the baling apparatus, such that the tag is placed, with respect to a finished bale, at a substantially known location, wherein said location is within the bale material, but proximate an outer surface of the finished bale.

In some embodiments, the baling apparatus is a square baler, and the tag is placed into either the first or the last slice of a multiple slice bale.

In some embodiments, the baling apparatus is a round baler for forming a bale of known diameter, and the tag is inserted into the bale when the bale is approaching its final diameter.

In some embodiments, the tag is an RFID tag.

In some embodiments, the tag is inserted via gravity, wherein the tag is allowed to fall into place while intermingling with material being conveyed to the bale chamber.

In some embodiments, the tag is inserted via piston driver that engages an individual tag, pushing it into the path taken by the material being conveyed to the bale chamber.

In some embodiments, the tag is inserted via a pulse of compressed gas to push the tag into the material being conveyed to the bale chamber.

In some embodiments, the tag is associated with a reference in an electronic data base corresponding to one or more characteristics of the tagged bale.

Some embodiments of the invention provide an apparatus for inserting a tag into a bale including a tag dispenser positioned outside the flow of crop material in a baling apparatus, such that a single tag may be dispensed into the flow of bale material at a predetermined time prior to reaching the bale chamber.

Some embodiments of the invention provide a system for labeling and tracking bales. Such embodiments include at least one apparatus for tagging bales, a reader, and an electronic database for tracking the bale information.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF ILLUSTRATIVE EMBODIMENTS

When baling hay or other material in a square bale, a baling apparatus is typically outfitted with a pre-chamber that forms a slice of bale material. That slice is injected into the main bale chamber. Once enough slices have been added and the bale reaches full (or other predetermined) size, it trips the knotters and it wraps twine. The twine is tied around the bale while it is still in the bale chamber. The timing of this tying step can be used to determine whether a last slice has been produced, or whether a first slice is being produced.

Figure 1:
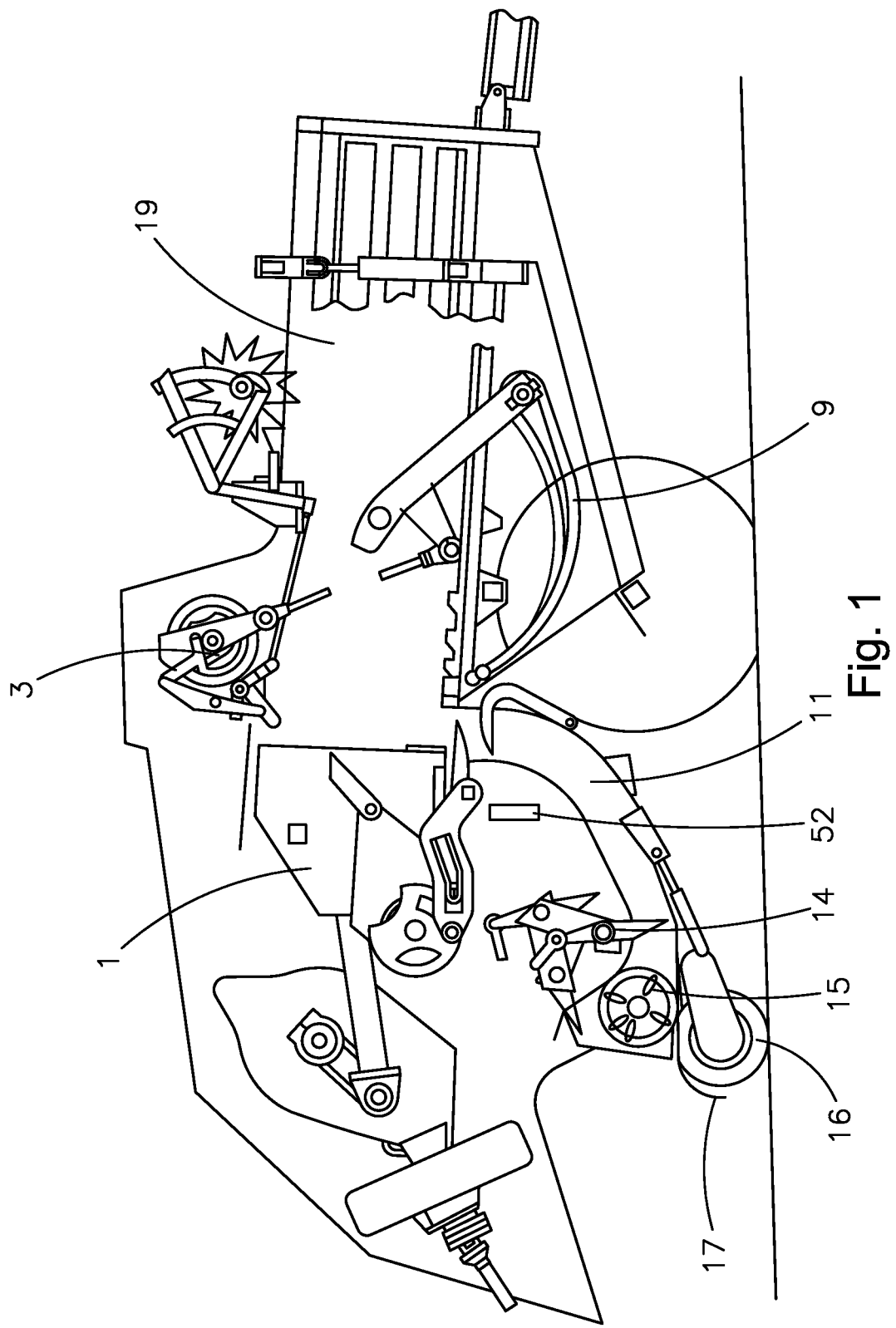
FIG. 1 is a schematic drawing of a baler employing the tagging apparatus in accordance with an embodiment of the invention.

As shown in FIG. 1, the pre-chamber appears to the left of the drawing and includes a pick-up area and pre-chamber 11. The pick-up area includes pickup tines 16, optional baffle plates 17, and the centering augers 15 which work together to pick-up material 60 and align it for conveyance toward a bale chamber 19 for formation into a bale 26. From here, the material passes a element 14, which may be forks or a rotor fork, to convey the crop from the pickup 16 into the pre-chamber 11. Material 60 is conveyed to the pre-chamber 11 where it is partially compressed. The pre-chamber 11 is used to establish how much material 60 is in each slice. The operator can regulate the amount of material in one slice. Once that amount is reached, the material in the pre-chamber 11 is ejected into the bale chamber 19 by a crop holding finger, stuffer fork, and/or arm 12.

Once a slice is formed and ejected from the pre-chamber 11, a plunger 1, which may be continually driving like a piston in an engine, compresses the bale, forcing a slice, in FIG. 1 from left to right in the bale chamber 19. In this manner, slices are pushed to the right, as shown in FIG. 1, and compressed while forming the bale. When a bale is completely formed, the first slice and the last slice are found at opposite ends.

As the bale forms, force is applied to the bale by the side walls to prevent the bale from exiting the bale chamber. Hydraulic cylinders push the walls of the bale chamber inward to resist bale movement. The more pressure the side walls exert on the bale the tighter the bale is formed. The cylinder (vertical) is shown below the number 19 in FIG. 1. At the first end of the bale, twine is already in place as the bale forms. Once it is determined that the bale has formed and the bale must be tied, it is held in place by the needles 9 while the knotters 3 tie off the bale. We need not be concerned with the details of the tying procedure or apparatus, just the timing.

Figure 6:
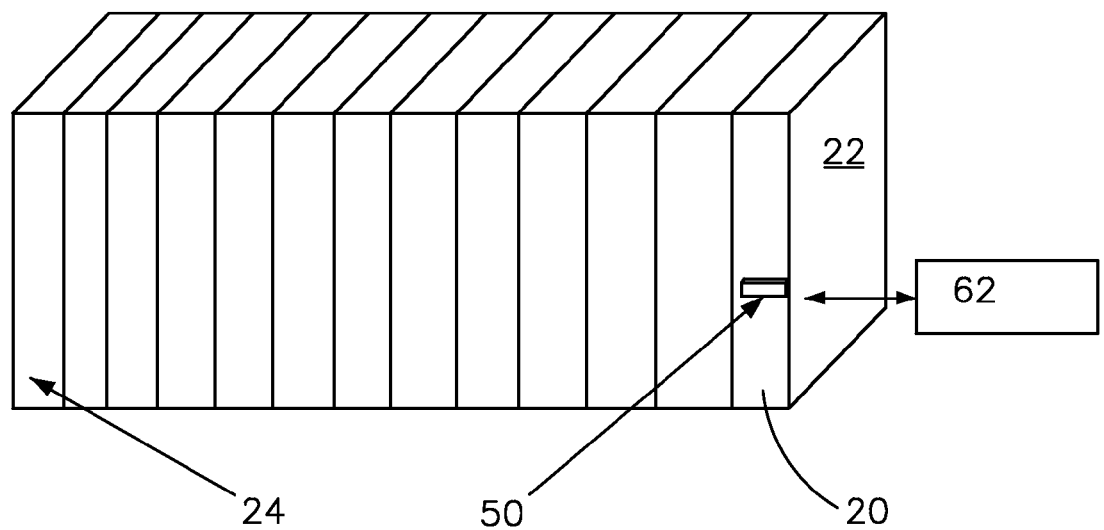
FIG. 6 is a diagrammatic view of an individual bale, indicating the slices, and showing the approximate position of a tag inserted in accordance with some embodiments of the invention.

As a bale is tied, a new slice begins being formed in the pre-chamber 11. It is at this point that a tag can be inserted into the bale material to ensure that the tag is in the first slice 20, which will define at least one outer surface 22 (See FIG. 6). In this manner, the tag 50 is placed within the first slice 20 and thus within the width of the first slice 20 to the outside surface 22. In some embodiments, the tag 50 is placed less than about 5 inches from the outer surface 22. This distance allows the tag 50 to be read by an external reader 62 passing next to the outside surface 22. Tags placed deeper into the bale suffer from weakened signal strength and require stronger signals and/or the reader to be closer to the bale, or might not even be able to be read. Of course, the distance will depend upon several factors, not the least of which is the type of tag being used, and the limitations of that technology.

The tying of a square bale also indicates the formation of the last slice 24. To facilitate placing a tag 50 in the last slice rather than the first, the apparatus must be provided with a controller 58 and a sensor, which may be electrical, mechanical, or other type of sensor, which indicates that the slice will be the last slice 24. This can be a separate device or one already present in the baling apparatus which signals the upcoming tying event. The sensor, acknowledging that the bale is almost complete, and the last slice is being formed, will then facilitate insertion of the tag 50 into the crop material 60 forming the last slice 24. In this manner, the tag 50 again, is ensured to be within close proximity to an outer surface 22 of the finished bale 26. Additionally, in some embodiments, each bale will have the same number of slices since each slice has the same amount of material dictated by the pre chamber setting. Consequently by counting slices, the baler can determine when the last slice is entering the prechamber, independent of the tying operation.

Regardless of whether the tag 50 is in the first slice 20 or the last slice 24, the tying process can continue as normal, with no need to apply any type of tag or other marker on the tie material or the bale itself. In some embodiments, a tag could be placed in each of the first and last slices to minimize concerns with bale orientation. The time and cost involved would be minimal. When placing a tag in both the first and last slice, the two tags should both contain identical information.

In a round baler, the bale is formed by continually adding circumferential layers to the bale, in a spiral fashion. The bale size grows to a maximum diameter, before it is tied and ejected. Again, the tying mechanism or other sensor can be used to trigger the insertion event. Once the bale reaches a certain diameter, the insertion device can be triggered with the controller 58 to insert a tag into the last circumferential layer of the round bale. In this manner, the tag is inserted into the bale proximate a circumferential outer surface.

Figure 7:
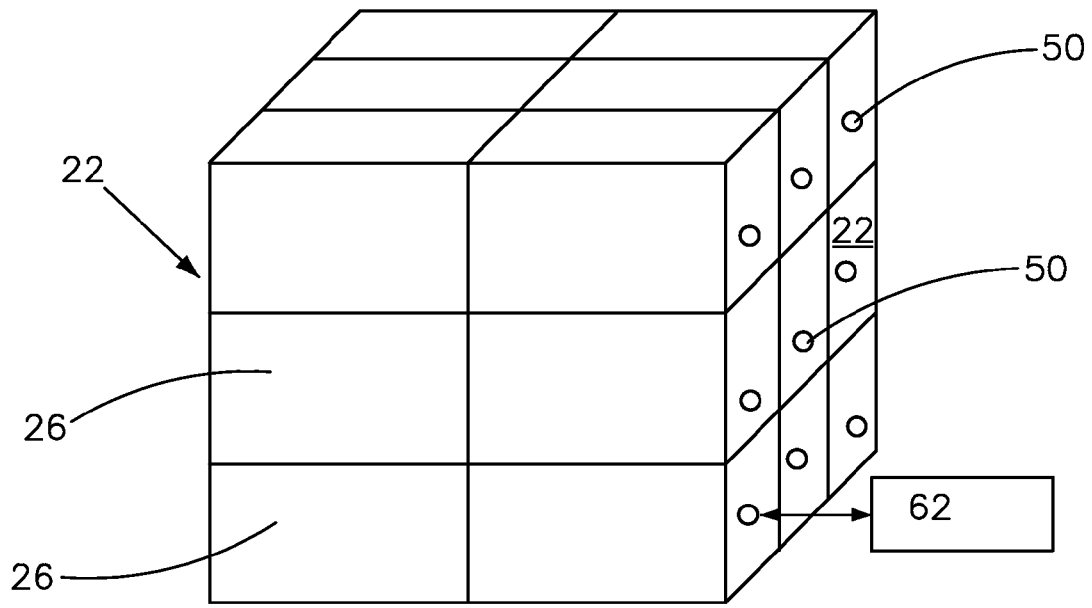
FIG. 7 is a diagrammatic view of a bale stack, containing eighteen stacked bales, and showing the approximate position of tags inserted into each bale in accordance with some embodiments of the invention.

The square bales are preferred, as knowing which slice the tag is placed reduces the need to search for the tag when attempting to read the tag. Of course, even just knowing the tag is at one end limits and thus speeds the search. Square bales can also be placed in orderly rows with the surfaces containing the sensors being placed facing outwardly. In this manner, square bales may be stored in bale stacks, two bales wide, with tagged slices faces out, of any length, and any height, taking safety and reason into consideration as shown in FIG. 7.

In such an arrangement, a reader device 62, whether manually or otherwise employed, can be passed next to the bale stack(s) to keep track of inventory, to locate a particular bale, etc. With such a system, a worker could simply walk up and down the aisles, taking readings as he or she went to locate specific bales 26, track inventory, etc. It is contemplated that a reader device 62 could be incorporated into a tractor, forklift, or any other device that comes into close proximity with a bale, such that any time a bale is picked up, moved, or otherwise handled, the reader and an interfacing computer system can automatically or upon a download of information track that bale. Similar systems could be employed with round bales.

In a round bale, since it is difficult to distinguish one portion of the outer circumference of the bale from another, it may require additional searching. Also, in the round bale situation, it is possible that the bale may wind up resting on the surface closest to the tag. Square bales are usually stacked with the face of the first or last slice facing outward.

In some embodiments, the tag is inserted into the crop flow some time after initial pickup at pickup 16 but before being discharged from the pre-chamber 11. That is, the tag 50 is not inserted into a formed or forming bale in the bale chamber, but rather into the material 60 as it is being prepared to enter the pre-chamber or in the pre-chamber 11 itself.

Figure 4:
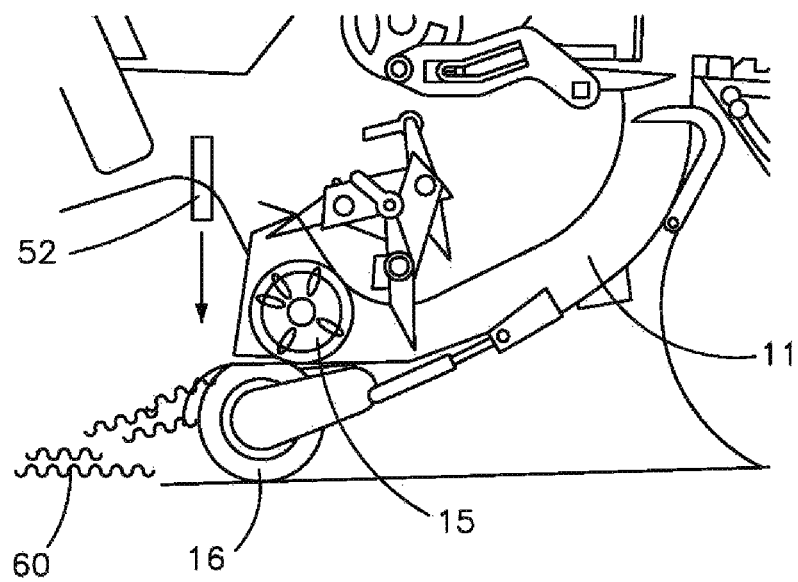
FIG. 4 is a zoomed view of the pick-up and pre-chamber area of a baler employing the tagging apparatus in accordance with an embodiment of the invention.

Because a bale is formed by compressing the material, it can be difficult to insert the tag 50 into an established bale. These pressures begins to form in the pre-chamber 11, where material 60 is collected and pressed into a slice. Thus, in some embodiments, the tag 50 is inserted into the material 60 flow prior to the pre-chamber, as shown in FIG. 4.

A tag dispenser 52 is provided for holding a plurality of tags 50, for dispensing a single tag 50 when required. The dispenser 52 may take any form, such as a hopper or a magazine (52a). The tags 50 may be inserted by any suitable means, including gravity, compressed air, or a mechanical device.

Figure 3:
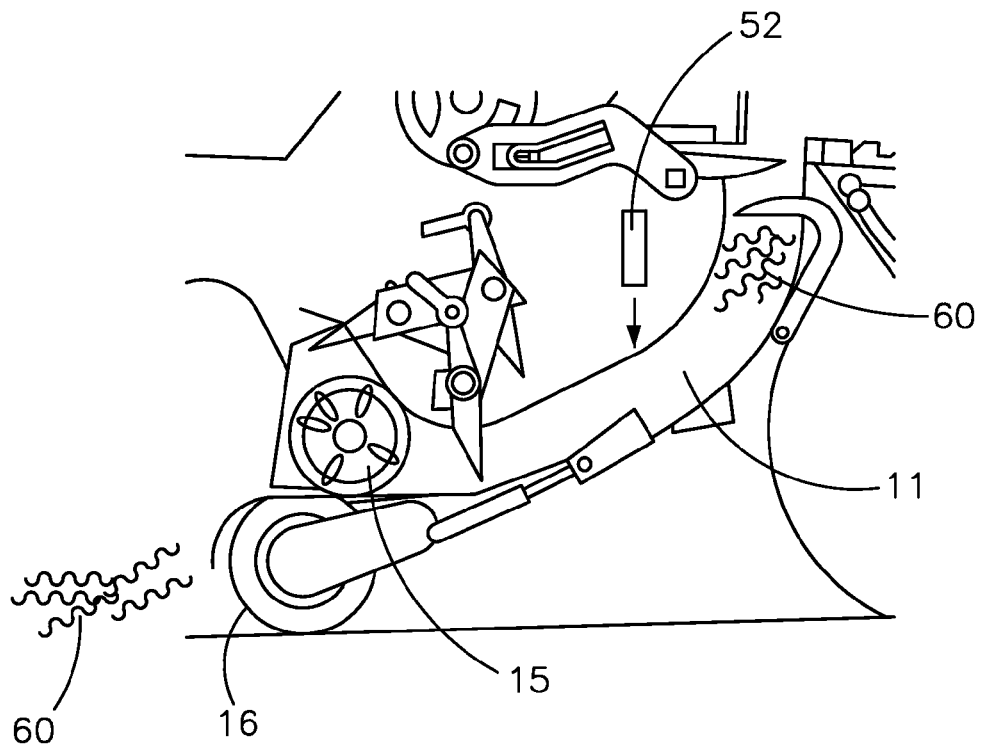
FIG. 3 is a zoomed view of the pick-up and pre-chamber area of a baler employing the tagging apparatus in accordance with an embodiment of the invention.

In some embodiments, a tag dispenser is provided for holding a plurality of tags which are fed individually into the material flow via gravity. Upon determination that the slice being formed is to be tagged, the dispenser allows for a single tag to enter the material flow where it is passed to the pre-chamber and eventually the bale chamber. In some embodiments, the gravity fed system is used to dispense the tag into the crop material flow prior to compression in the pr-chamber. This type of dispenser may be electronically or mechanically controlled to dispense the tag at the proper time. Examples of gravity fed apparatus are shown in FIGS. 3 and 4, where the down arrow indicates the path of a tag 50, as it drops from the dispenser 50 into the flow of crop material 60.

Figure 2:
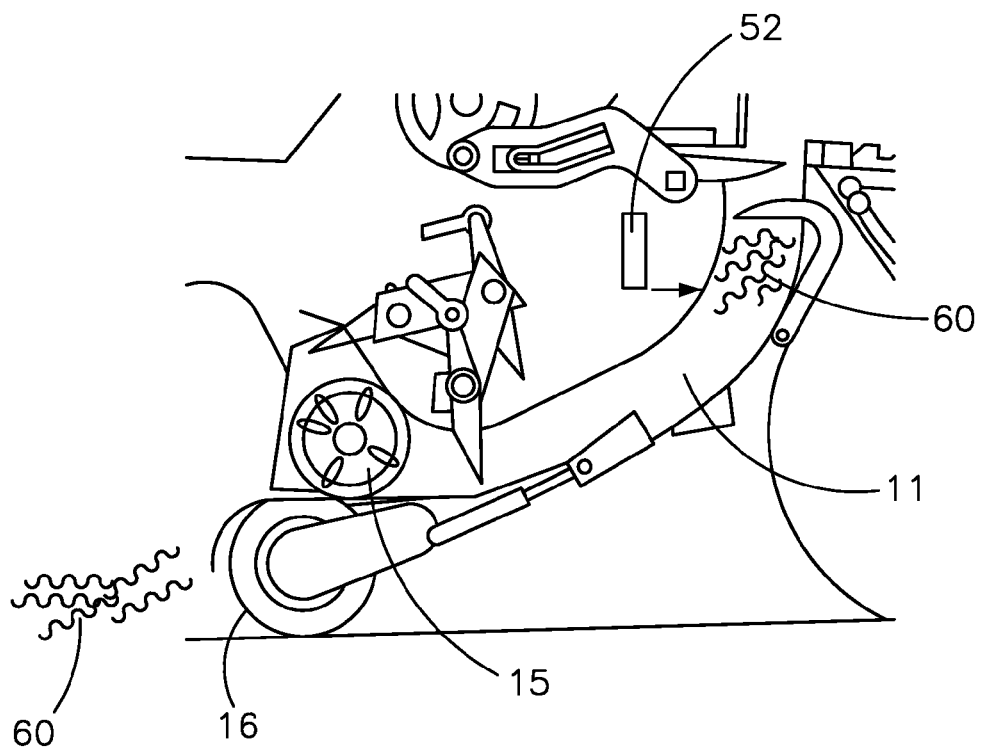
FIG. 2 is a zoomed view of the pick-up and pre-chamber area of a baler employing the tagging apparatus in accordance with an embodiment of the invention.
Figure 5:
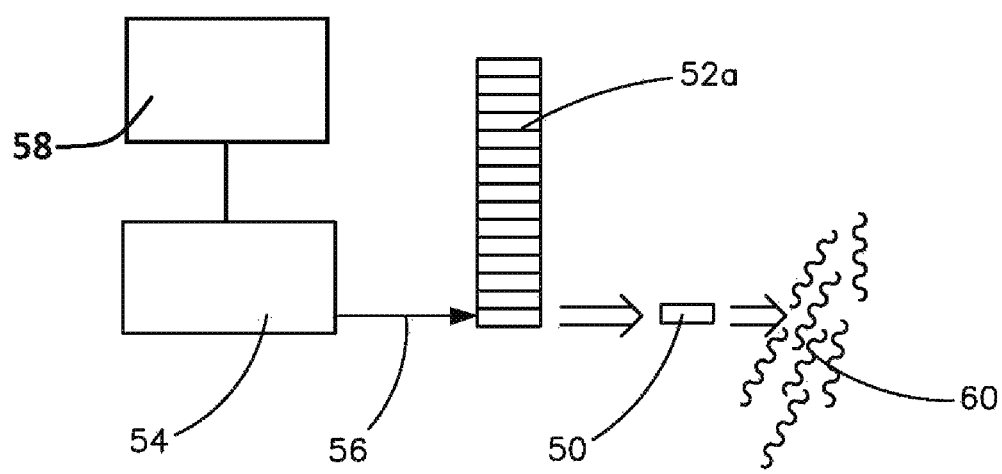
FIG. 5 is a schematic drawing showing a pressure or mechanical fed apparatus for inserting a tag in accordance with some embodiments of the invention.

In some embodiments, particularly where it is desired to insert the tag into the more dense pre-chamber material, a tag dispenser 52 may be provided that employs some force to push the tag 50 into the semi-compressed material. (Of course this method could also be used in uncompressed material.) For example in FIG. 2, a tag dispenser 52, such as a magazine 52, could hold tags such that a burst of compressed air pushes the tag into the material. In another embodiment, a plunger or rod could be used to engage the tag and push it into the material. FIG. 5 shows a schematic of such an arrangement. A device 54, such as compressed gas or a mechanical plunger is activated such that the force, applied by the gas or the plunger is applied in the direction of arrow 56 forcing the tag 50, out of magazine 52a, and into the crop material 60. In some embodiments, such as shown in FIG. 2, this activity ensures that the tag 50 enters into the forming and compressed material 60 in the pre-chamber 11.

The tag used is preferably one that is remotely identifiable, such as a Radio Frequency Identification (RFID) tag. Other technologies may be used, such as electronic or RF transmitters or other wireless technologies. The RFID is especially well-suited because of it's small size, which allows it to be ingested and passed by livestock without harm. If the tag is to be removed, it could be provided with a tail or flag which will extend beyond the outer surface of the bale for easy removal.

The dispenser 52 or baling apparatus can be provided with a tag reader to track which tag 50 is placed into a bale.

During baling, the bale characteristics are not known. However, with the tag, the bale can be identified later. Once the bale's properties are known, they can be associated with that tag using software. The information on the bale's properties, such as harvest date, location, weight, moisture content, nutritional value, storage location, etc. will preferably be kept in an electronic database for future access. Alternatively, the tag may include a memory for storage of information relating to bale properties. In this manner, individual bales can be identified and located according to any of a number of properties. For example if a certain livestock farm desired certain nutritional values for its feedstocks, an operator could access the data base to find those bales that match, singly or in the aggregate, the need. The data base could also be used to ensure proper aging times or to ensure freshness through a first in first out system. The dispenser could also include a tag writer which adds information to the tag. For instance field location, date, time, etc. could be added just prior to tagging. In this manner, an operator could update tag information in real time, even when moving from one field or farm to the next.

Although the invention has been described with reference to exemplary embodiments, it is not limited thereto. For example, it is foreseeable that various types of tags could be used or that the dispensing mechanism could be made and operated in any of a variety of ways. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. An agricultural square baling apparatus for forming a square bale, the apparatus comprising:
    a baling chamber;
    a feeding mechanism configured for conveying crop material from a pickup to the baling chamber, the feeding mechanism comprising a pre-chamber;
    a tag dispenser positioned adjacent the feeding mechanism, the tag dispenser located outside the flow of the crop material in the pre-chamber, such that a single tag is dispensed into the flow of crop material prior to reaching the baling chamber, wherein said tag dispenser is operatively coupled to a controller for controlling the dispensing of the single tag from the tag dispenser;
    said controller is activated either through electrical or mechanical mechanism to dispense the single tag into the crop material, wherein said controller is activated for dispensing said single tag in either or both the first or last slice of crop material in the pre-chamber.

2. The apparatus of claim 1, wherein said dispenser is substantially above the flow of crop material such that the tag is dispensed into the flow via gravity.

3. The apparatus of claim 2, wherein said dispenser is a hopper for holding a plurality of tags and adapted for dispensing a single tag at a time.

4. The apparatus of claim 1, wherein said dispenser is laterally disposed from the flow of crop material.

5. The apparatus of claim 1, wherein said single tag is inserted during formation of at least one slice.

* * * * *